United States Patent [19]

Taira

[11] 4,268,959
[45] May 26, 1981

[54] PIPE CUTTER

[75] Inventor: Tsuneo Taira, Nara, Japan

[73] Assignee: Rex Industries Co., Ltd., Osaka, Japan

[21] Appl. No.: 14,266

[22] Filed: Feb. 22, 1979

[30] Foreign Application Priority Data

Oct. 18, 1978 [JP] Japan .................. 53-142055[U]

[51] Int. Cl.³ .......................................... B23D 21/10
[52] U.S. Cl. ..................................................... 30/94
[58] Field of Search ........................... 30/93, 94, 95; 81/180 R; 269/96

[56] References Cited

U.S. PATENT DOCUMENTS

| | | | |
|---|---|---|---|
| 1,065,016 | 6/1913 | Anderson | 269/96 |
| 1,448,877 | 3/1923 | Smith | 30/94 |
| 1,773,096 | 8/1930 | Cousineau | 30/94 |
| 3,097,550 | 7/1963 | Johnston | 81/180 R |
| 3,608,194 | 9/1971 | Miller | 30/94 |

Primary Examiner—Jimmy C. Peters
Attorney, Agent, or Firm—Merchant, Gould, Smith, Edell, Welter & Schmidt

[57] ABSTRACT

A pipe cutter comprising a pair of support arms which can move away from and come near one another along and on guide means, said support arms being provided with opposed pipe holding means having rotating support rollers to rotatably hold a pipe to be cut, therebetween, at least one of the pipe holding means being provided with a tool bit which can move in radial directions of the pipe, independently of the movement of the pipe holding means.

2 Claims, 1 Drawing Figure

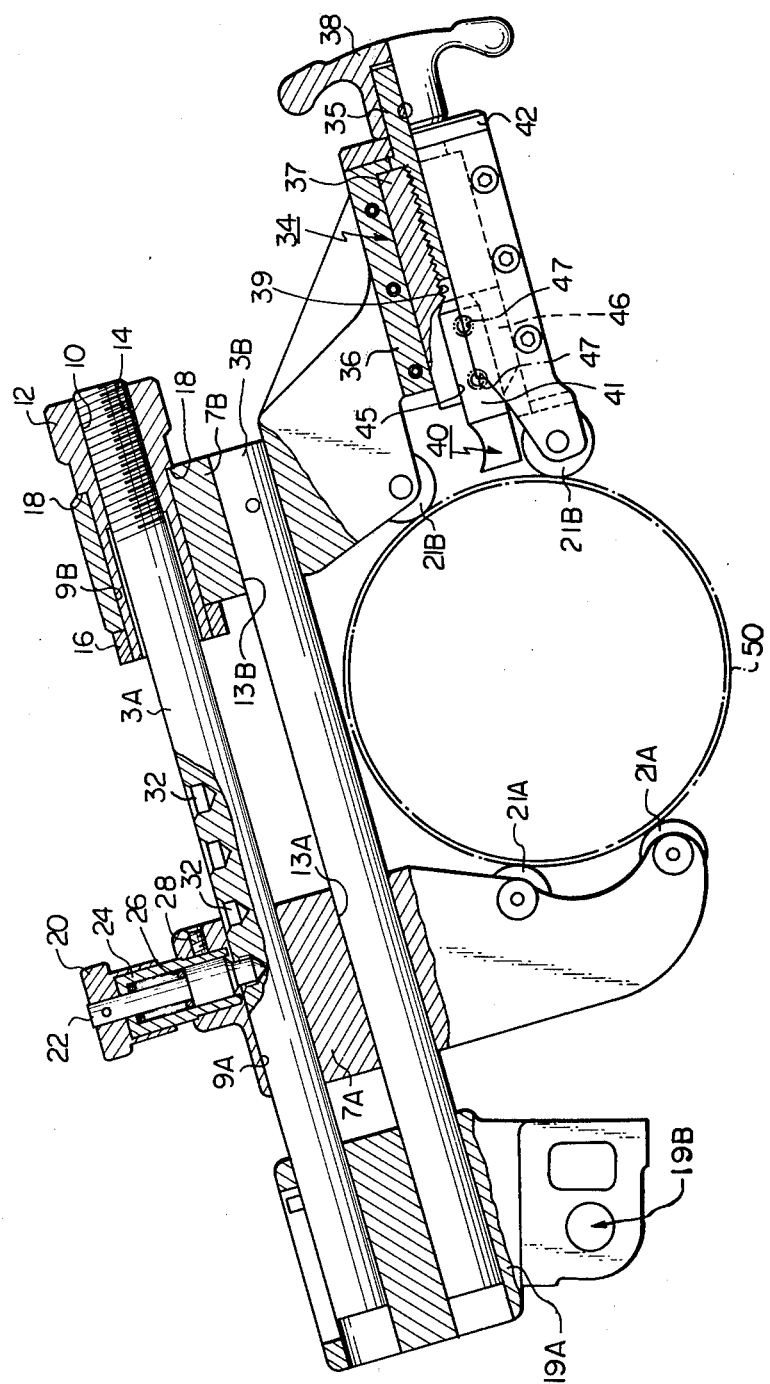

PIPE CUTTER

This invention relates to a pipe cutter which can be attached on the periphery of a pipe or the like, to cut, groove or chamfer the same. In particular, the invention relates to a simple pipe cutter in which a tool bit is used as the cutting means to obtain a fine cut surface.

In conventional known grinding wheel pipe cutters or roller wheel pipe cutters, particularly when they are used to cut plastic lined steel pipes, the plastic lining is torn, and/or burred and/or burnt, the latter resulting in the emission of a bad smell. Futhermore, the above mentioned known pipe cutters cannot be, in practice, adapted to cut a pipe having a relatively large thickness.

The object of the present invention is to provide a simple pipe cutter in which a tool bit is used as a cutting tool in order to eliminate the above mentioned drawbacks.

The invention will now be discussed in detail with reference to the accompanying drawing which is a partially sectioned elevational view of a pipe cutter according to the invention.

A pair of supporting arms 7A and 7B are mounted on a pair of parallel guide bars 3A and 3B which form guide means, respectively. These supporting arms 7A and 7B can move relatively away from and towards one another, as explained hereinafter. As shown in the diagram, the supporting arm 7B is secured to one end of the guide bar 3B and the supporting arm 7A is movable along and on the guide bars 3A and 3B. The supporting arms 7A and 7B are provided with holes 9A and 9B through which the guide bar 3A extends, and with holes 13A and 13B through which the guide bar 3B extends.

In the hole 9B of the supporting arm 7B there is a rotatable adjustment knob 12 which is in the form of a hollow sleeve and which is provided with an internal threaded bore 10 in which is screwed one end of the guide bar 3A. For the purpose of the screw engagement between the guide bar 3A and the threaded bore 10 of the knob 12, the guide bar 3A is provided, on one end, with an outer threaded portion 14. A ring member 16 is rigidly connected to the front end of knob 12, so that the upper portion of the supporting arm 7B is held with no gap between the ring member 16 and a shoulder portion 18 of the knob 12, so as to ensure an adjustable slide movement. By the above mentioned construction, the rotation of the knob, i.e. the sleeve, makes it possible to reciprocally move the supporting arm 7B along and on the guide bar 3A in axial directions of the latter.

On the upper portion of the supporting arm 7A there is provided a positioning knob 20, to which a positioning pin 22 is secured. The knob 20 is slidably mounted in a hollow housing 24 which is fixed to the upper portion of the supporting arm 7A by means of a set screw 28. In the hollow housing 24 there is provided a spring 26 which is adapted to always press the pin 22 and accordingly the knob 20, downward.

The guide bar 3A is provided with a plurality of positioning holes 32 which are arranged in accordance with the diameters of pipes 50 to be cut. The positioning pin 22 is fitted, at its lower end, in a selected one of the holes 32. The disengagement of the pin 22 from one of the holes 32 by the upward movement of the knob 20 against the force of the spring 26 enables the supporting arm 7A to freely move on and along the guide bars 3A and 3B. The numeral 19A designates a mounting arm which is adapted to mount the cutter to, for example, a body of a cutting device or any other machine tool. In this case, the cutter shown in the drawing can be, for example, mounted to the body of such a cutting device by inserting a pin (not shown) in a hole 19B. When the cutter is used alone on the pipe to be cut, without mounting the same to any other device, the mounting arm 19 can be dispensed with.

On the lower portions of the supporting arms 7A and 7B there are rotatably mounted rotating support rollers 21A and 21B which form the pipe holding means.

On the lower portion of the supporting arm 7B there is provided a tool holder 34 which comprises a body 36 secured to and held by the supporting arm 7B. In the holder body 36 there is a slidably arranged mount 37 to which a tool bit 40 is detachably attached. The tool bit 40 can be, for example, fitted in a corresponding U shaped recess 45 formed in the mount 37, and can be held in the recess by means of a cap plate 46 in which there are screwed set screws 47 the front ends of which bear against a tool shank 41. The mount 37 has a threaded hole 39 in which is screwed a screw rod 35 which includes a knob 38 secured thereto and which extends through an end plate 42 fixed to the body 36. Thus, when the screw rod 35 is rotated by means of the knob 38, the mount 37 and, accordingly, the tool bit 40 are independently moved in radial directions of the pipe 50.

The pipe cutter constructed as described above will be operated as follows.

First, the knob 12 is rotated to bring the supporting arm 7B to its extreme right end position in the drawing. In this position the tool bit 40 occupies a retracted position. Then, the pipe cutter is mounted to a pipe 50. The holes 32 of the guide bar 3A are arranged so that the positions of the holes 32 correspond to standardized diameters of pipes to be cut.

After the knob 20 is pulled upward to release the pin 22 from a hole 32 in which the pin 22 has been fitted, the supporting arm 7A is moved along and on the guide bars 3A and 3B and the pin 22 is fitted in the hole 32 corresponding to the diameter of the pipe 50. The supporting arm 7A is thus set in place.

Then, the knob 12 is slightly rotated in a direction opposite to that in the above mentioned first operation to move the supporting arm 7B toward the supporting arm 7A, so that the pipe 50 is rotatably clamped by the four support rollers 21A and 21B.

Finally, the knob 38 is rotated until the cutting edge of the tool bit 40 is brought into contact with the outer periphery of the pipe 50. After that, the pipe 50 can be rotated by means of driving means (not shown). The tool bit 40 can be moved inwardly several times in a radial direction by means of the knob 38 during the cutting operaton in accordance with the thickness of the pipe until the pipe is completely cut.

It is only necessary only to clamp the pipe 50 by three points on its periphery and, accordingly, the pair of rollers 21A or 21B on the supporting arms 7A or 7B may be replaced by a single roller (not shown). In such a case, the single roller may be placed at an intermediate point between the two rollers 21A or 21B.

According to the present invention, as will be understood from the above discussion, since a tool bit is used as the cutting tool, in place of grinding wheels or roller wheels, a cut surface of a pipe presenting a fine finish and having a right angle to the axis of the pipe, can be obtained.

Futhermore, it will be easily understood that it is possible to not only cut but also groove and/or chamfer a pipe by modifying the shape of the tool bit.

What is claimed is:

1. A pipe cutter comprising, in combination:

first and second support arms;

guide bar means receiving said support arms for relative sliding movement therebetween;

roller means on said support arms for engaging a pipe to be cut at at least three points around the periphery thereof;

a cutting bit carried by said first support arm for radial movement with respect to a pipe engaged by said roller means;

means operable to cause sliding movement of said first support arm with respect to said guide bar means;

and positioning means for said second support arm, comprising a plurality of aligned depressions spaced along said guide bar means and detent means carried by said second support arm for releasably engaging any one of the depressions to fix the position of said second support arm along said guide bar means, said detent means comprising a pin having a first end configured for reception in any of said depressions, means guiding said pin along an axis for movement toward and away from said guide bar means to enable insertion of said first end into and retraction of said first end from said depressions, means resiliently urging said pin towards said guide bar means, and means for manually actuating said pin away from said guide bar means.

2. Apparatus according to claim 1 in which said guide bar means comprises first and second spaced parallel bars slidably in said second support arm and having axes defining a reference plane, one end of said second bar being fixed in said first support arm, one end of said first bar being received in said second support arm for axial adjustment with respect thereto, said pin comprising a cylindrical surface having it axis lying in said reference plane, said depressions comprising cylindrical surfaces having generally parallel axes lying in said reference plane, and said roller means extending orthogonally to said reference plane at sites spaced beyond said second bar.

* * * * *